(12) United States Patent
Hwang et al.

(10) Patent No.: US 12,429,747 B2
(45) Date of Patent: Sep. 30, 2025

(54) LENS DRIVING DEVICE (71) Applicant: LG INNOTEK CO., LTD., Seoul (KR)

(72) Inventors: Deok Ki Hwang, Seoul (KR); Jun Young Lim, Seoul (KR); Jae Hoon Jun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 356 days.

(21) Appl. No.: 17/908,351

(22) PCT Filed: Mar. 19, 2021

(86) PCT No.: PCT/KR2021/003421
§ 371 (c)(1),
(2) Date: Aug. 31, 2022

(87) PCT Pub. No.: WO2021/187940
PCT Pub. Date: Sep. 23, 2021

(65) Prior Publication Data
US 2023/0065237 A1 Mar. 2, 2023

(30) Foreign Application Priority Data
Mar. 19, 2020 (KR) .................. 10-2020-0034103

(51) Int. Cl.
G03B 3/10 (2021.01)
(52) U.S. Cl.
CPC ..................... G03B 3/10 (2013.01)
(58) Field of Classification Search
CPC ... G03B 3/10; G03B 3/12; G03B 3/32; G03B 3/34; G03B 3/36; G03B 2205/0061; G02B 7/04; G02B 7/06; G02B 7/08; G02B 7/09

USPC ......................................................... 359/824
See application file for complete search history.

(56) References Cited

U.S. PATENT DOCUMENTS

| 4,894,672 A | 1/1990 | Tanaka |
| 5,636,062 A | 6/1997 | Okuyama et al. |
| 9,179,048 B2* | 11/2015 | Lee ................... G02B 7/09 |
| 2009/0225453 A1* | 9/2009 | Chang ................ G02B 7/08 |
| | | 359/824 |

(Continued)

FOREIGN PATENT DOCUMENTS

| CN | 101526661 A | 9/2009 |
| JP | 4-126235 U | 11/1992 |

(Continued)

Primary Examiner — Marin Pichler
(74) Attorney, Agent, or Firm — Birch, Stewart, Kolasch & Birch, LLP (57) ABSTRACT The present embodiment relates to a lens driving device comprising: a lens barrel; a lens disposed in the lens barrel; and a driving unit disposed in the lens barrel, wherein: the driving unit includes a piezoelectric element expanding or contracting in a direction perpendicular to an optical axis direction of the lens when a voltage is applied thereto, a first member disposed on the piezoelectric element, and a second member coupled to the first member and disposed in the lens barrel; the lens barrel moves in the optical axis direction of the lens when the voltage is applied to the piezoelectric element; and a first length in the lengthwise direction of the first member is shorter than a second length in the lengthwise direction of the second member.

20 Claims, 3 Drawing Sheets (56) References Cited

U.S. PATENT DOCUMENTS

| | | | | |
|---|---|---|---|---|
| 2010/0027119 | A1* | 2/2010 | Kollar | G02B 23/16 |
| | | | | 359/507 |
| 2012/0249868 | A1* | 10/2012 | Kamatani | H04N 23/55 |
| | | | | 348/E5.025 |
| 2017/0324892 | A1 | 11/2017 | Kim et al. | |
| 2019/0129132 | A1 | 5/2019 | Fan et al. | |
| 2020/0041872 | A1 | 2/2020 | Köpfer | |
| 2024/0094602 | A1* | 3/2024 | Ye | H04N 23/54 |

FOREIGN PATENT DOCUMENTS

| | | |
|---|---|---|
| KR | 10-2005-0042922 A | 5/2005 |
| KR | 10-2007-0013043 A | 1/2007 |
| KR | 10-2012-0112029 A | 10/2012 |
| KR | 10-1700771 B1 | 1/2017 |
| KR | 10-2019-0096133 A | 8/2019 |
| KR | 10-2020-0002024 A | 1/2020 |

* cited by examiner

LENS DRIVING DEVICE

CROSS REFERENCE TO RELATED APPLICATIONS

This application is the National Phase of PCT/KR2021/003421 filed on Mar. 19, 2021, which claims priority under 35 U.S.C. § 119 (a) to Patent Application No. 10-2020-0034103 filed in the Republic of Korea on Mar. 19, 2020, all of which are hereby expressly incorporated by reference into the present application.

TECHNICAL FIELD

The present embodiment relates to a lens driving device.

BACKGROUND ART

A portable device such as a tablet PC or a smart phone is provided with a camera module that acquires image information from a subject. The camera module of such a portable device is increasingly required to have a high pixel density and high performance, and recently, products capable of auto focus (AF) and optical zoom in which the focal lengths can be varied are being released.

In general, a camera module provided in a portable device moves a lens in an optical axis direction to adjust autofocus and/or optical zoom. In order to move the lens, a voice coil motor (VCM) type actuator that moves the lens by electromagnetic force by placing a coil and a magnet in the camera module is widely used.

However, since the actuator of the existing VCM method has a weak driving force, it is difficult to implement a long stroke for high magnification zoom.

In addition, when the stroke length of the existing VCM actuator is increased for high magnification zoom control, the sizes of coils and magnets are also increasing, thereby making it difficult to miniaturize the camera module.

In addition, the existing VCM actuator has a problem in that unnecessary power is consumed due to magnetic field interference of a magnet.

DETAILED DESCRIPTION OF THE INVENTION

Technical Subject

The present embodiment is to provide a lens driving device capable of realizing a long stroke using a piezoelectric element.

Another object of the present invention is to provide a lens driving device capable of rapidly driving a lens group having a high magnification and a high weight through a driving unit using a lever principle.

Technical Solution

A lens driving device according to the present embodiment comprises: a lens barrel; a lens being disposed in the lens barrel; and a driving unit being disposed in the lens barrel, wherein the driving unit comprises a piezoelectric element being elongated or contracted in a direction perpendicular to an optical axis direction of the lens when a voltage is applied thereto, a first member being disposed in the piezoelectric element, and a second member being coupled with the first member and being disposed in the lens barrel, wherein the lens barrel moves in an optical axis direction of the lens when the voltage is applied to the piezoelectric element, and wherein a first length in a lengthwise direction of the first member is shorter than a second length in a lengthwise direction of the second member.

In addition, the first angle formed by the first member and the second member may be varied when the voltage is applied to the piezoelectric element.

In addition, the first angle formed by the first member and the second member in an initial state in which the voltage is not applied to the piezoelectric device may be smaller than the second angle formed by the first member and the second member when the voltage is applied to the piezoelectric device.

In addition, the first member and the second member may be hinge-coupled.

In addition, the moving distance of the lens barrel in the optical axis direction may be determined by a ratio between the first length of the first member and the second length of the second member.

In addition, the moving distance of the lens barrel in the optical axis direction may be determined by the quantity of the second member.

In addition, it comprises a housing being disposed at an outer side of the lens barrel; the housing comprises an upper plate and first to fourth side plates being extended from the upper plate; and the driving unit may be disposed in the first side plate of the housing.

In addition, it comprises a third member disposed to be intersected with the first member and a fourth member being coupled with the third member and being disposed to be intersected with the second member; the first side plate of the housing comprises a slit being extended in the optical axis direction; and each of a first intersection point of the first member and the third member and a second intersection point of the second member and the fourth member may be disposed in the slit of the first side plate of the housing.

In addition, it comprises a first pin being disposed in the lens barrel, and a second pin being disposed in the lens barrel and spaced apart from the first pin; and the first pin and the second pin may guide movement of the lens barrel in the optical axis direction.

In addition, it may comprise an electrode being disposed between a lower portion of the piezoelectric element and the first member, and a sensor being spaced apart from the electrode.

In addition, the separation distance in a direction perpendicular to the optical axis direction between the electrode and the sensor comprises a first separation distance in an initial state in which the voltage is not applied to the piezoelectric element; the first separation distance is changed to a second separation distance smaller than the first separation distance in a direction perpendicular to the optical axis direction when the voltage is applied to the piezoelectric element; and the lens barrel may move away from the piezoelectric element in the optical axis direction when the voltage is applied to the piezoelectric element.

In addition, it may comprise an electrode being disposed in the first member and a sensor being disposed in the second member and being overlapped with the electrode in the optical axis direction.

In addition, the separation distance in the optical axis direction between the electrode and the sensor comprises a third separation distance in an initial state in which the voltage is not applied to the piezoelectric element; the third separation distance is changed to a fourth separation distance greater than the third separation distance in the optical axis direction when the voltage is applied to the piezoelectric element; and the lens barrel may move away from the piezoelectric element in the optical axis direction when the voltage is applied to the piezoelectric element.

A camera module according to the present embodiment may comprise the lens driving device Advantageous Effects The present embodiment may provide a lens driving device capable of implementing a long stroke using a piezoelectric element.

In addition, it is possible to provide a lens driving device capable of quickly driving a high magnification and high weight lens group through a driving unit using a lever principle.

In addition, it is possible to provide a lens driving device that is 10 times or more fast than the moving speed of the conventional VCM type actuator.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

Hereinafter, a configuration of a lens driving device according to a first embodiment of the present invention will be described with reference to the drawings.

Figure 1:
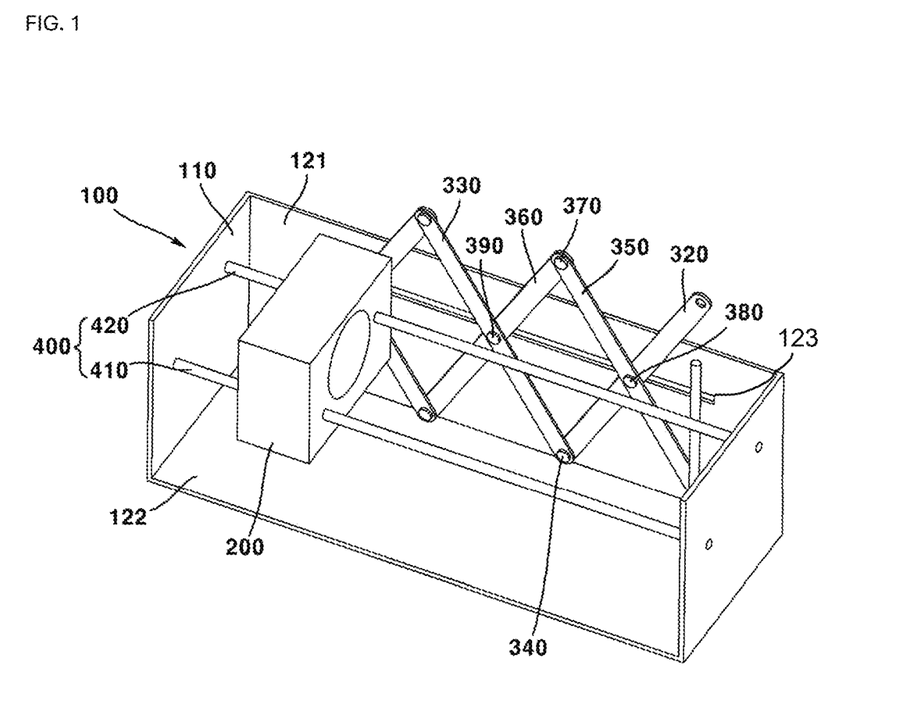
FIG. 1 is a perspective view of a lens driving device according to a first embodiment of the present invention.
Figure 2:
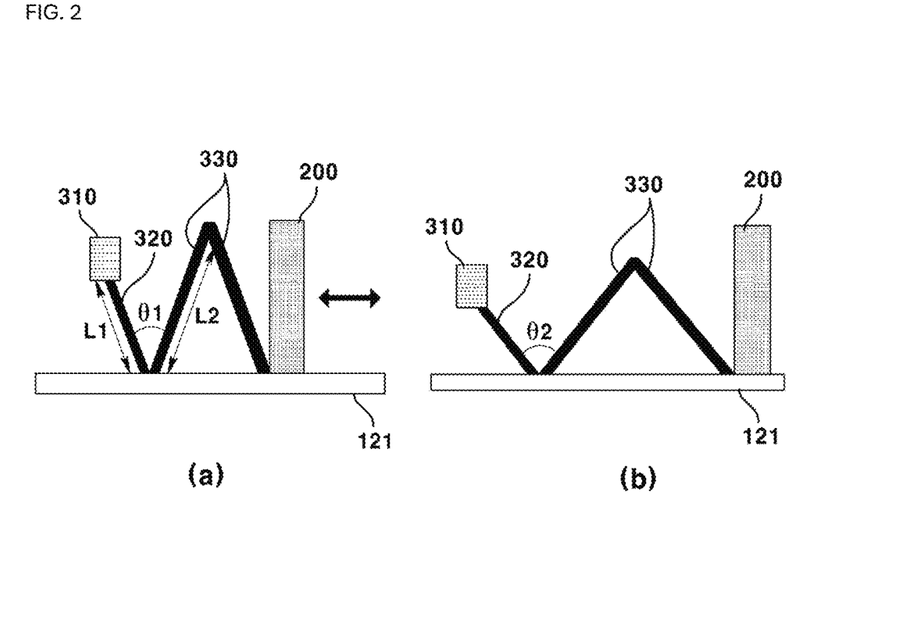
FIG. 2 is a schematic diagram of a lens driving device according to a first embodiment of the present invention.

FIG. 1 is a perspective view of a lens driving device according to a first embodiment of the present invention; and FIG. 2 is a schematic diagram of a lens driving device according to a first embodiment of the present invention.

The lens driving device according to a first embodiment of the present invention may comprise a housing 100. The housing 100 may form an outer appearance of a lens driving device. The housing 100 may be formed in a hexahedral shape with an open lower surface.

The housing 100 may be disposed at an outer side of the lens barrel 200. The housing 100 may accommodate the lens barrel 200. The housing 100 may be formed of an insulating material. The housing 100 may be formed of an injection molding material. The housing 100 may comprise an upper plate 110 and a side plate 120 being extended from the upper plate 110. The side plate 120 may be extended downward from the edge of the upper plate 110 of the housing 100. The side plate 120 may be extended from an edge of the upper plate 110 of the housing 100. The side plate 120 may comprise a first side plate 121, a second side plate 122, a third side plate being disposed at an opposite side of the first side plate 121, and a fourth side plate being disposed at an opposite side of the second side plate. A driving unit 300 may be disposed in the first side plate 121. The driving unit 300 may be disposed between the first side plate 121 and the lens barrel 200. A slit 123 may be formed in the first side plate 121.

The housing 100 may comprise four side portions and four corner portions being disposed between the four side portions. The side portion of the housing 100 may comprise a first side portion, a second side portion, a third side portion being disposed at an opposite side of the first side portion, and a fourth side portion being disposed at an opposite side of the second side portion. A corner portion of the housing 100 may comprise: a first corner portion being disposed between the first side portion and the second side portion; a second corner portion being disposed between the second side portion and the third side portion; a third corner portion being disposed between the third side portion and the fourth side portion; and a fourth corner portion being disposed between the fourth side portion and the first side portion. The side portion of the housing 100 may comprise a 'lateral wall'.

The housing 100 may comprise a slit 123. The slit 123 may be formed in the first side plate 121. The slit 123 may be a hole penetrating the first side plate 121 in a direction perpendicular to the optical axis. The slit 123 may be formed along the lengthwise direction of the first side plate 121. The slit 123 may be formed in the first side plate 121 along an optical axis direction. A third hinge part 380 in which the first member 320 and the third member 250 intersect may be disposed in the slit 123. A fourth hinge part 390 in which the second member 330 and the fourth member 360 intersect may be disposed in the slit 123. The slit 123 may be a passage through which the third hinge part 380 and the fourth hinge part 390 move in an optical axis direction. The slit 123 may reduce frictional force with the first side plate 121 when the third hinge part 380 and the fourth hinge part 390 move in an optical axis direction.

The lens driving device according to a first embodiment of the present invention may comprise a lens barrel 200. The lens barrel 200 may be disposed inside the housing 100. The lens barrel 200 may be disposed below the upper plate 110 of the housing 100. The lens barrel 200 may be disposed inside the side plate 120 of the housing 100. The lens barrel 200 may comprise a lens therein. The lens barrel 200 may comprise a plurality of lenses therein. The lens barrel 200 may comprise a hole in which the lens is accommodated. The lens barrel 200 may be moved in an optical axis direction of the lens by the driving unit 300. Through this, an auto focus function may be performed. In addition, zooming can be performed.

The lens barrel 200 may be formed in a hexahedral shape. The lens barrel 200 may be formed to have a rectangular cross-section. The lens barrel 200 may comprise: a first side portion; a second side portion; a third side portion being disposed at an opposite of the first side portion; and a fourth side portion being disposed at an opposite of the second side portion. The lens barrel 200 may comprise: a first corner portion being disposed between the first side portion and the second side portion; a second corner portion being disposed between the second side portion and the third side portion; a third corner portion being disposed between the third side portion and the fourth side portion; and a fourth corner portion being disposed between the fourth side portion and the first side portion. In the above description, the lens barrel 200 has been described on the premise that it has a hexahedral shape, but the present invention is not limited thereto, and the lens barrel 200 may be formed in a cylindrical shape or the like.

The driving unit 300 may be disposed in the lens barrel 200. The driving unit 300 may be disposed in a first side portion of the lens barrel 200. A second member 330 may be disposed in a first side portion of the lens barrel 200. A first connection member 332 may be disposed in a first side portion of the lens barrel 200. In this case, the second member 330 may not be disposed in a first side portion of the lens barrel 200. A fourth member 360 may be disposed in a first side portion of the lens barrel 200. The lens barrel 200 may be moved in an optical axis direction by the movement of at least one of the second member 330 and the fourth member 360. The lens barrel 200 may be moved in an optical axis direction of the lens when a voltage is applied to the piezoelectric element 310.

The lens driving device according to a first embodiment of the present invention may comprise a driving unit 300. The driving unit 300 may be disposed in the lens barrel 200. The driving unit 300 may be disposed in a first side portion of the lens barrel 200. The driving unit 300 may be disposed in the first side plate 121 of the housing 100. The driving unit 300 may be disposed between the first side portion of the lens barrel 200 and the first side plate 121 of the housing 100.

The driving unit 300 may comprise a piezoelectric element 310. The piezoelectric element 310 may be a piezo. The piezoelectric element 310 may generate power to move the lens barrel 200 in an optical axis direction. The piezoelectric element 310 may be elongated and contracted in a lengthwise direction of the piezoelectric element 310 when a voltage is applied. The piezoelectric element 310 may be elongated and contracted in a direction perpendicular to the optical axis when a voltage is applied. When a voltage is applied so that the piezoelectric element 310 is elongated in a first direction perpendicular to the optical axis, the piezoelectric element 310 is elongated in a first direction to press one end of the first member 320. When a voltage is applied so that the piezoelectric element 310 is contracted in a second direction perpendicular to the optical axis and opposite to the first direction, the length of the piezoelectric element 310 may be shortened to its original state. At this time, the first member 320 may also return to its original position.

The driving unit 300 may comprise a first member 320. The first member 320 may be disposed in the piezoelectric element 310. The first member 320 may be a member for delivering power to be generated from the piezoelectric element 310. The first member 320 may be disposed at a lower portion of the piezoelectric element 310. The first member 320 may be coupled with the second member 320. One end of the first member 320 may be disposed in the piezoelectric element 310 and the other end may be coupled with the second member 320. The first member 310 may be hinge-coupled with the second member 320. A first hinge part 340 may be disposed at the other end of the first member 310.

The first member 320 may have a first length L1 in a lengthwise direction of the first member 320. The first length L1 of the first member 320 may be shorter than a second length L2 of the second member 330 in a lengthwise direction. A ratio between the first length L1 of the first member 320 and the second length L2 of the second member 330 may be one of one to two, one to three, and one to four. That is, when the first length L1 is 1 mm, the second length L2 may be 2 mm. When the first length L1 is 1 mm, the second length L2 may be 3 mm. When the first length L1 is 1 mm, the second length L2 may be 4 mm. At this time, the moving distance of the lens barrel 200 in an optical axis direction may be determined by a ratio between the first length L1 of the first member 320 and the second length L2 of the second member 330. The driving energy for moving the lens barrel 200 may be inversely proportional to a ratio between the first length L1 of the first member 320 and the second length L2 of the second member 330. That is, as the second length L2 of the second member 330 increases with respect to the first length L1 of the first member 320, the driving energy for moving the lens barrel 200 may decrease.

The driving unit 300 may comprise a second member 330. The second member 330 may be a member for delivering power to be generated from the piezoelectric element 310. The second member 330 may be coupled with the first member 320. The second member 330 may be disposed in the lens barrel 200. One end of the second member 330 may be coupled with the first member 320, and the other end may be disposed in the first side portion of the lens barrel 200. One end of the second member 330 may be coupled with the first member 320, and the other end may be coupled with the first connection member 332. In this case, the second member 330 may not be disposed in the first side portion of the lens barrel 200. The second member 330 may be hinge-coupled with the first member 320. A first hinge part 340 may be disposed at one end of the second member 330. The second member 330 may be rotated about the first hinge part 340 with respect to the first member 320. When the piezoelectric element 310 is elongated in a first direction to press the first member 320, the second member 330 may rotate about the first hinge part 340. In this case, the other end of the first member 320 and one end of the second member 330 are moved in an optical axis direction, and the lens barrel 200 may be moved in an optical axis direction by a corresponding displacement together with the first member 320 and the second member 330.

The driving unit 300 may comprise a first connection member 332. The first connection member 332 may be disposed in the lens barrel 200. The first connection member 332 may be disposed in a first side portion of the lens barrel 200. One end of the first connection member 332 may be disposed in a first side portion of the lens barrel 200, and the other end may be coupled with the second member 330. The first connection member 332 may be disposed between the lens barrel 200 and the second member 330. In this case, the first connection member 332 may receive the power of the piezoelectric element 310 being delivered from the second member 330 to move the lens barrel 200 in an optical axis direction.

The second member 330 may comprise a plurality of second members 330. The moving distance of the lens barrel 200 in an optical axis direction may be determined by the quantity of the second members 330. As the number of the second members 330 increases, the moving distance of the lens barrel 200 in an optical axis direction may increase. In this case, a long stroke may be implemented. Specifically, a stroke distance of 6 mm or more can be secured. For example, in order to secure a stroke distance of 6 mm or more, in a structure in which the first length L1 of the first member 320 is 1 mm and the second length L2 of the second member 330 is 3 mm, four second members 330 may be required. In addition, in a structure in which the first length L1 of the first member 320 is 1 mm and the second length L2 of the second member 330 is 4 mm, three second members 330 may be required. However, the present invention is not limited thereto, and the first length L1 of the first member 320, the second length L2 of the second member 330, and the quantity of the second members 330 may be determined depending on the stroke distance required for zooming.

The first member 320 and the second member 330 may be disposed in a zigzag shape. The first member 320 and the second member 330 may move with the lever principle using the first hinge part 340 as a fulcrum. Through this, it is possible to form a long stroke with little force. In addition, as the first member 320 and the second member 330 are disposed in a zigzag manner, a long stroke may be realized and a height of the lens driving device in an optical axis direction may be minimized. The first angle θ1 formed by the first member 320 and the second member 330 may be varied when a voltage is applied to the piezoelectric element 310. The first angle θ1 formed by the first member 320 and the second member 330 in an initial state in which no voltage is applied to the piezoelectric element 310 may be smaller than the second angle θ3 formed by the first member 320 and the second member 330 when a voltage is applied to the piezoelectric element 310 so that the piezoelectric element 310 is elongated in a first direction.

The driving unit 300 may comprise a third member 350. The third member 350 may be disposed to be intersected with the first member 320. The third member 350 may comprise a first intersection point at a portion where it is intersected with the first member 320. The third member 350 may be coupled with the first member 320 at the first intersection point with the first member 320. The third member 350 may be hinge-coupled with the first member 320. The third member 350 may comprise a third hinge part 380 at the first intersection point. The third hinge part 380 may be disposed in the slit 123 of the first side plate 121 of the housing 100. At least a portion of the third hinge part 380 may be disposed inside the slit 123 of the first side plate 121 of the housing 100. The third member 350 may be rotated about the third hinge part 380 with respect to the first member 320. That is, when the first member 320 is pressed by the piezoelectric element 310, the third hinge part 380 may move in a direction toward the upper plate 110 of the housing 100. The third member 350 may move in a direction opposite to the movement direction of the first member 320. That is, when the first member 320 moves in a first direction, the third member 350 may move in a second direction opposite to the first direction. The third member 350 may move in a first direction when the first member 320 moves in a second direction. Through this, it is possible to increase the moving speed of the lens barrel 200 in an optical axis direction even with a small power.

A third length of the third member 350 in a lengthwise direction may be the same as the first length L1 of the first member 320. The third member 350 may be disposed parallel to the second member 330. The third length of the third member 350 may be shorter than the second length L2 of the second member 330. The third length of the third member 350 may be shorter than a fourth length of the fourth member 360. One end of the third member 350 may be coupled with the fourth member 360. One end of the third member 350 may be hinge-coupled with the fourth member 360. At this time, the second hinge part 370 may be disposed at one end of the third member 350.

The driving unit 300 may comprise a fourth member 360. The fourth member 360 may be disposed to be intersected with the second member 330. The fourth member 360 may comprise a second intersection point at a portion where it is intersected with the second member 330. The fourth member 360 may be coupled with the second member 330 at the second intersection point with the second member 330. The fourth member 360 may be hinge-coupled with the first member 320. The fourth member 360 may comprise a fourth hinge part 390 at the second intersection point. The fourth hinge part 390 may be disposed in the slit 123 of the first side plate 121 of the housing 100. At least a portion of the fourth hinge part 390 may be disposed inside the slit 123 of the first side plate 121 of the housing 100. The fourth hinge part 390 may be overlapped with the third hinge part 380 in an optical axis direction. The fourth member 360 may be rotated about the fourth hinge part 390 with respect to the second member 330. That is, when the first member 320 is pressed by the piezoelectric element 310, the fourth hinge part 390 may move in a direction directing toward the upper plate 110 of the housing 100. The fourth member 360 may move in a direction opposite to the moving direction of the second member 330. That is, when the second member 330 moves in a first direction, the fourth member 360 may move in a second direction opposite to the first direction. The fourth member 360 may move in a first direction when the second member 330 moves in a second direction. Through this, it is possible to increase the moving speed of the lens barrel 200 in an optical axis direction even with a small power.

The driving unit 300 may comprise a fourth member 360. The fourth member 360 may be a member for delivering power to be generated from the piezoelectric element 310.

The fourth member 360 may be coupled with the third member 350. The fourth member 360 may be disposed in the lens barrel 200. One end of the fourth member 360 may be coupled with the third member 350, and the other end may be disposed in the first side portion of the lens barrel 200. One end of the fourth member 360 may be coupled with the third member 350, and the other end may be coupled with the connection member 362. In this case, the fourth member 360 may not be disposed in the first side portion of the lens barrel 200. The fourth member 360 may be hinge-coupled with the third member 350. A second hinge part 370 may be disposed at one end of the fourth member 360. The fourth member 360 may be rotated about the second hinge part 370 with respect to the first member 320. When the piezoelectric element 310 is elongated in a first direction to press the first member 320, the fourth member 360 may rotate about the second hinge part 370. In this case, one end of the fourth member 360 may be moved in an optical axis direction, and the lens barrel 200 may be moved together with the fourth member 360 in an optical axis direction by a corresponding displacement.

The driving unit 300 may comprise a connection member 362. The second connection member 362 may be disposed in the lens barrel 200. The second connection member 362 may be disposed in a first side portion of the lens barrel 200. One end of the second connection member 362 may be disposed in the first side portion of the lens barrel 200 and the other end may be coupled with the fourth member 360. The second connection member 362 may be disposed between the lens barrel 200 and the fourth member 360. In this case, the second connection member 362 may receive the power of the piezoelectric element 310 being delivered from the fourth member 360 to move the lens barrel 200 in an optical axis direction.

A fourth length of the fourth member 360 in a lengthwise direction may be the same as the second length L2 of the second member 330. The fourth member 360 may be disposed parallel to the first member 320. The fourth length of the fourth member 360 may be shorter than the first length L1 of the first member 320. The fourth length of the fourth member 360 may be shorter than the third length of the third member 350. One end of the fourth member 360 may be coupled with the third member 350. One end of the fourth member 360 may be hinge-coupled with the third member 350. At this time, the second hinge part 370 may be disposed at one end of the fourth member 360. The third hinge part 380 and the fourth hinge part 390 may move along the slit 125 in an optical axis direction when the first member 320 and the second member 330 move.

The lens driving device according to a first embodiment of the present invention may comprise a guide unit 400. The guide unit 400 may comprise a first pin 410. The first pin 410 may be disposed in the lens barrel 200. The first pin 410 may be spaced apart from the second pin 420. The first pin 410 may be disposed closer to the driving unit 300 than the second pin 420. The first pin 410 may guide the movement of the lens barrel 200 in an optical axis direction. One end of the first pin 410 may be disposed in an upper plate of the housing 100. The other end of the first pin 410 may be disposed in a lower plate of the housing 100. The first pin 410 may be disposed parallel to the second pin 420.

The guide unit 400 may comprise a second pin 420. The second pin 420 may be disposed in the lens barrel 200. The second pin 420 may be spaced apart from the first pin 410. The second pin 420 may be disposed farther from the driving unit 300 than the first pin 410. The second pin 420 may guide the movement of the lens barrel 200 in an optical axis direction. One end of the second pin 420 may be disposed in an upper plate of the housing 100. The other end of the second pin 420 may be disposed in a lower plate of the housing 100. The second pin 420 may be disposed parallel to the first pin 410.

Figure 3:
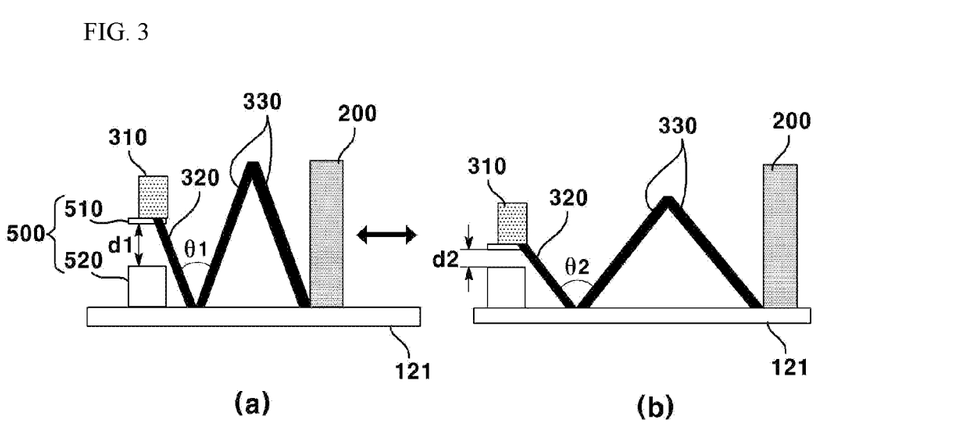
FIG. 3 is a graph showing the movement distance of the lens barrel according to a second length of a second member of a lens driving device according to a first embodiment of the present invention in an optical axis direction.

FIG. 3 is a graph showing the movement distance of the lens barrel according to a second length of a second member of a lens driving device according to a first embodiment of the present invention in an optical axis direction. The x-axis means the number of second members 330, the y-axis means the movement distance (mm) of the lens barrel 200 in an optical axis direction, (a) is a linear graph when the second length L2 of the second member 330 is 2 mm, (b) is a linear graph when the second length L2 of the second member 330 is 3 mm, and (c) shows a linear graph when the second length L2 of the second member 330 is 4 mm.

TABLE 1

| | Movement distance in optical axis direction (mm) | | |
|---|---|---|---|
| Second length (L2) (mm) | 2 | 3 | 4 |
| Quantity of second member 1 | 1.67 | 2.22 | 2.78 |
| 2 | 2.78 | 3.89 | 5 |
| 3 | 3.89 | 5.56 | 7.22 |
| 4 | 5 | 7.22 | 9.45 |
| 5 | 6.11 | 8.89 | 11.67 |

Referring to FIG. 3 and Table 1, when the second length L2 of the second member 330 is 2 mm, it can be seen that a long stroke of 6 mm can be realized when the number of the second members 330 is 5 or more. It can be seen that when the second length L2 of the second member 330 is 3 mm, a long stroke of 6 mm can be realized when there are four or more second members 330. It can be seen that when the second length L2 of the second member 330 is 4 mm, a long stroke of 6 mm can be realized when there are three or more second members 330.

Hereinafter, a configuration of a lens driving device according to a second embodiment of the present invention will be described with reference to the drawings.

Figure 4:
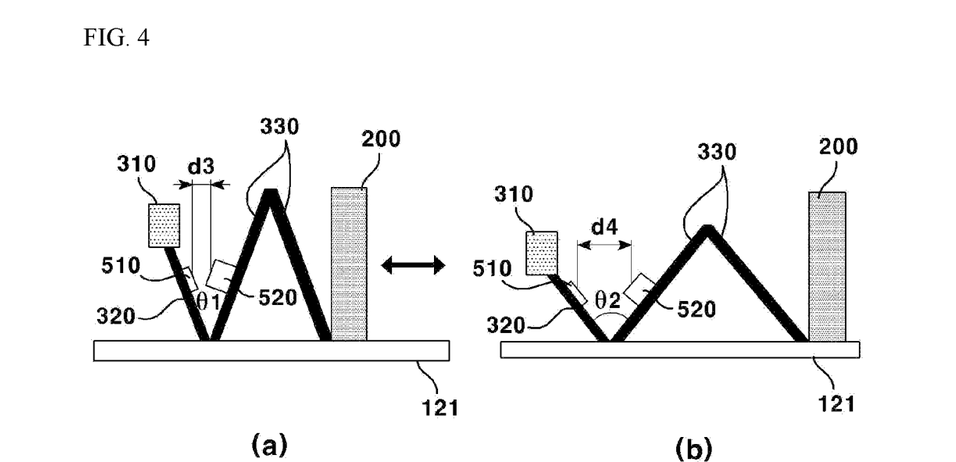
FIG. 4 is a schematic diagram of a lens driving device according to a second embodiment of the present invention.

FIG. 4 is a schematic diagram of a lens driving device according to a second embodiment of the present invention.

The lens driving device according to a second embodiment of the present invention may be interpreted as having the same configuration as the lens driving device according to a first embodiment except for the sensor unit 500.

The lens driving device according to a second embodiment of the present invention may comprise a sensor unit 500. The sensor unit 500 may comprise a cap sensor. The sensor unit 500 may detect the movement of the first member 320. Through this, the sensor unit 500 may control the movement distance of the lens barrel 200 in an optical axis direction.

The sensor unit 500 may comprise an electrode 510. The electrode 510 may be disposed at a lower portion the piezoelectric element 310. The electrode 510 may be disposed at one end of the first member 320. The electrode 510 may be disposed between the piezoelectric element 310 and the first member 320. The electrode 510 may be spaced apart from the sensor 520.

The sensor unit 500 may comprise a sensor 520. The sensor 520 may be spaced apart from the electrode 510. The sensor 520 may be overlapped with the electrode 510 in a direction perpendicular to the optical axis. The sensor 520 may be disposed in the first side plate 121 of the housing 100. The sensor 520 may be disposed in the first side plate 121 of the housing 100 to be overlapped with the electrode 510 in a direction perpendicular to the optical axis.

The sensor value (C, cap value) of the sensor unit 500 may be changed by a separation distance in a direction perpendicular to the optical axis between the sensor 520 and the electrode 510. The sensor value C of the sensor unit 500 may be inversely proportional to a separation distance in a direction perpendicular to the optical axis between the sensor 520 and the electrode 510. The sensor value C of the sensor unit 500 may be proportional to the area of the electrode 510. The sensor value C of the sensor unit 500 may be determined by the following [Conditional Expression].

$$C=\varepsilon_0 \times \varepsilon_r \times A/d \quad \text{Conditional Expression}$$

Here, A means the area of the electrode 510, d means the separation distance in a direction perpendicular to the optical axis between the sensor 520 and the electrode 510, $\varepsilon_0 = 8.854 \times 10^{-12}$, and $\varepsilon_r = 1$.

The sensor unit 500 may have a first separation distance d1 in a direction perpendicular to the optical axis between the sensor 520 and the electrode 510 in an initial state in which no voltage is applied to the piezoelectric element 310. When a voltage is applied to the piezoelectric element 310 to be elongated in a first direction perpendicular to the optical axis, the sensor unit 500 may have a second separation distance d2 in a direction perpendicular to the optical axis between the sensor 520 and the electrode 510. The first separation distance d1 may be greater than the second separation distance d2.

Hereinafter, a configuration of a lens driving device according to a third embodiment of the present invention will be described with reference to the drawings.

Figure 5:
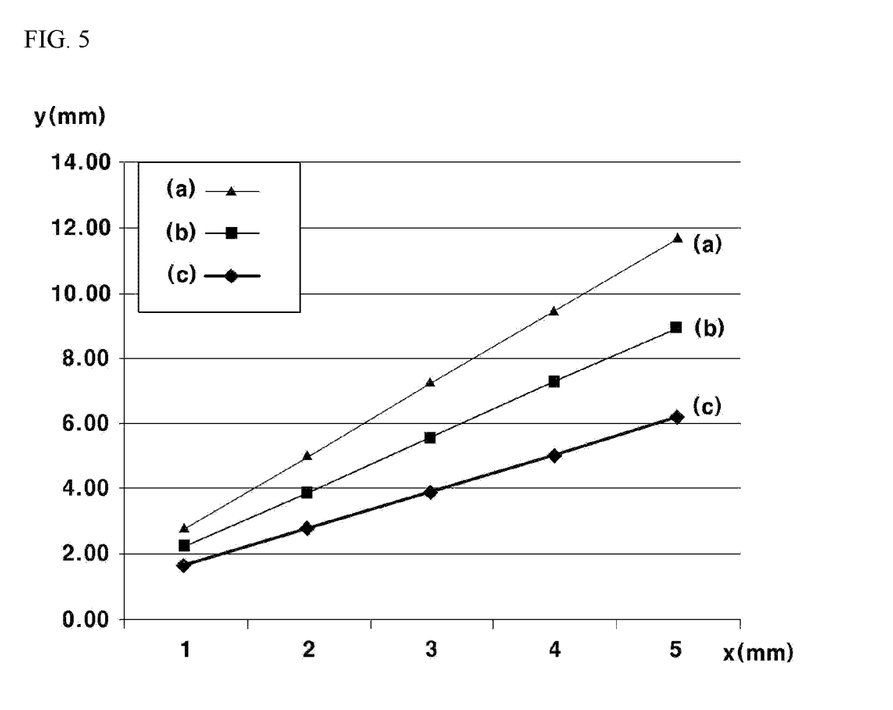
FIG. 5 is a schematic diagram of a lens driving device according to a third embodiment of the present invention.

FIG. 5 is a schematic diagram of a lens driving device according to a third embodiment of the present invention.

The lens driving device according to a third embodiment of the present invention may be interpreted as having the same configuration as the lens driving device according to a first embodiment except for the sensor unit 500.

The lens driving device according to a third embodiment of the present invention may comprise a sensor unit 500. The sensor unit 500 may comprise a cap sensor. The sensor unit 500 may detect the movement of the first member 320. Through this, the sensor unit 500 may control the movement distance of the lens barrel 200 in an optical axis direction.

The sensor unit 500 may comprise an electrode 510 and a sensor 520. The electrode 510 may be disposed in any one of the first member 320 and the second member 330. The sensor 520 may be disposed in any one of the first member 320 and the second member 330. When the electrode 510 is disposed in the first member 320, the sensor 520 is disposed in the second member 330, and when the electrode 510 is disposed in the second member 330, the sensor 520 may be disposed in the first member 320. However, the present invention is not limited thereto, and the electrode 510 and the sensor 520 may be disposed to be spaced apart from each other in the plurality of second members 330. Hereinafter, it is assumed that the electrode 510 is disposed in the first member 320 and the sensor 520 is disposed in the second member 330.

The sensor 520 may be spaced apart from the electrode 510. The sensor 520 may be overlapped with the electrode 510 in an optical axis direction. At least a portion of the sensor 520 may be overlapped with the electrode 510 in an optical axis direction. The sensor 520 may be disposed in the second member 330 at a position being overlapped with the electrode 510 in an optical axis direction.

The sensor value (C, cap value) of the sensor unit 500 may be changed depending on the separation distance in an optical axis direction between the sensor 520 and the electrode 510. The sensor value C of the sensor unit 500 may be inversely proportional to a separation distance in an optical axis direction between the sensor 520 and the electrode 510. The sensor value C of the sensor unit 500 may be proportional to an area in which the electrode 510 is overlapped with the sensor 520 in an optical axis direction.

The sensor unit 500 may have a third separation distance d3 in an optical axis direction between the sensor 520 and the electrode 510 in an initial state in which no voltage is applied to the piezoelectric element 310. The sensor unit 500 may have a fourth separation distance d4 in an optical axis direction between the sensor 520 and the electrode 510 when a voltage is applied so as to be elongated in a first direction perpendicular to the optical axis to the piezoelectric element 310. The fourth separation distance d4 may be greater than the third separation distance d3.

Although embodiments of the present invention have been described with reference to the accompanying drawings, those of ordinary skill in the art to which the present invention belongs will be able to understand that the present invention can be embodied in other specific forms without changing its technical spirit or essential features. Therefore, it should be understood that the embodiments described above are illustrative in all respects and not restrictive.

The invention claimed is:

1. A lens driving device comprising:
a housing;
a lens barrel disposed in the housing;
a lens disposed in the lens barrel; and
a driving unit disposed on the lens barrel,
wherein the driving unit comprises a piezoelectric element elongated or contracted in a direction perpendicular to an optical axis direction of the lens when a voltage is applied thereto, a first member disposed on the piezoelectric element, and a second member coupled with the first member and disposed on the lens barrel,
wherein the lens barrel is configured to move in an optical axis direction of the lens when the voltage is applied to the piezoelectric element,
wherein a first length in a lengthwise direction of the first member is shorter than a second length in a lengthwise direction of the second member,
wherein the housing comprises a slit extending in the optical axis direction, and
wherein at least a portion of each of the first member and the second member is configured to move along the slit of the housing.

2. The lens driving device of claim 1, wherein a first angle formed by the first member and the second member is varied when the voltage is applied to the piezoelectric element.

3. The lens driving device of claim 1, wherein a first angle formed by the first member and the second member in an initial state in which the voltage is not applied to the piezoelectric device is smaller than a second angle formed by the first member and the second member when the voltage is applied to the piezoelectric device.

4. The lens driving device of claim 1, wherein the first member and the second member are hinge-coupled.

5. The lens driving device of claim 1, wherein a moving distance of the lens barrel in the optical axis direction is determined by a ratio between a first length of the first member and a second length of the second member.

6. The lens driving device of claim 1, wherein a moving distance of the lens barrel in the optical axis direction is determined by a quantity of the second member.

7. The lens driving device of claim 1, wherein the housing comprises an upper plate and a side plate extending from the upper plate,
wherein the side plate of the housing comprises a first side plate and a second side plate,
wherein the second side plate is perpendicular to the upper plate and the first side plate, and
wherein the driving unit is disposed on the first side plate of the housing.

8. The lens driving device of claim 7, comprising a third member disposed to be intersected with the first member and a fourth member coupled with the third member and disposed to be intersected with the second member,
wherein the slit is located on the first side plate of the housing, and
wherein each of a first intersection point between the first member and the third member and a second intersection point between the second member and the fourth member is disposed on the slit of the first side plate of the housing.

9. The lens driving device of claim 1, comprising:
a first pin disposed on the lens barrel; and
a second pin disposed on the lens barrel and spaced apart from the first pin,
wherein the first pin and the second pin configured to guide a movement of the lens barrel in the optical axis direction.

10. The lens driving device of claim 1, comprising an electrode disposed between a lower portion of the piezoelectric element and the first member, and a sensor spaced apart from the electrode.

11. The lens driving device of claim 10, wherein, in the direction perpendicular to the optical axis direction, the electrode and the sensor are spaced apart by a first separation distance in an initial state in which the voltage is not applied to the piezoelectric element, and
wherein, in the direction perpendicular to the optical axis direction, the electrode and the sensor are spaced apart by a second separation distance smaller than the first separation distance when the voltage is applied to the piezoelectric element.

12. The lens driving device of claim 1, wherein the lens barrel moves away from the piezoelectric element in the optical axis direction when the voltage is applied to the piezoelectric element.

13. The lens driving device of claim 1, comprising an electrode disposed on the first member and a sensor disposed on the second member and overlapped with the electrode in the optical axis direction.

14. The lens driving device of claim 13, wherein, in the optical axis direction, the electrode and the sensor are spaced apart by a third separation distance in an initial state in which the voltage is not applied to the piezoelectric element, and
wherein, in the optical axis direction, the electrode and the sensor are spaced apart by a fourth separation distance greater than the third separation distance when the voltage is applied to the piezoelectric element.

15. A camera module comprising the lens driving device of claim 1.

16. The lens driving device of claim 1, wherein the first member and the second member are continuously in direct contact.

17. The lens driving device of claim 9, wherein the first pin and the second pin extend in the optical axis direction.

18. The lens driving device of claim 9, wherein the first pin and the second pin extend through the lens barrel.

19. The lens driving device of claim 9, wherein the first pin and the second pin extend through the lens barrel at different heights.

20. A lens driving device comprising:
a housing;
a lens barrel disposed in the housing;
a lens coupled to the lens barrel; and
a driving unit configured to move the lens barrel in an optical axis direction,
wherein the driving unit comprises a piezoelectric element, a first member disposed on the piezoelectric element, and a second member coupled with the first member and disposed on the lens barrel,
wherein a length of the piezoelectric element is configured to change when a voltage is applied to the piezoelectric element,
wherein, in the optical axis direction, a distance between the lens barrel and the piezoelectric element is increased when the voltage is applied to the piezoelectric element,
wherein the housing comprises a slit extending in the optical axis direction, and
wherein at least a portion of each of the first member and the second member is configured to move along the slit of the housing.

* * * * *